United States Patent
Biskeborn et al.

(10) Patent No.: US 11,532,320 B1
(45) Date of Patent: Dec. 20, 2022

(54) TAPE DRIVE CONFIGURED TO ENABLE MAGNETIC MEDIA TO FLY ABOVE AN UPSTREAM OR A DOWNSTREAM HEAD ASSEMBLY

(71) Applicant: Western Digital Technologies, Inc., San Jose, CA (US)

(72) Inventors: Robert G. Biskeborn, Hollister, CA (US); Oscar J. Ruiz, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/512,127

(22) Filed: Oct. 27, 2021

(51) Int. Cl.
*G11B 5/58* (2006.01)
*G11B 5/008* (2006.01)
*G11B 5/02* (2006.01)
*G11B 20/18* (2006.01)
*G11B 5/31* (2006.01)
*G11B 5/012* (2006.01)

(52) U.S. Cl.
CPC .......... *G11B 5/00852* (2013.01); *G11B 5/012* (2013.01); *G11B 5/02* (2013.01); *G11B 5/3103* (2013.01); *G11B 20/1886* (2013.01)

(58) Field of Classification Search
CPC ....... G11B 5/1871; G11B 5/4893; G11B 5/60; G11B 15/64; G11B 5/127; G11B 5/33; G11B 5/00; G11B 5/09; G11B 27/36; G11B 5/588
USPC ............ 360/323, 319, 327.21, 327.24, 77.12
See application file for complete search history.

(56) References Cited

U.S. PATENT DOCUMENTS

| | | | |
|---|---|---|---|
| 5,034,838 A | 7/1991 | Brock et al. | |
| 8,917,476 B2 | 12/2014 | Holmberg et al. | |
| 9,030,779 B2 | 5/2015 | Dellmann et al. | |
| 9,129,631 B1 | 9/2015 | Biskeborn et al. | |
| 9,177,580 B1 | 11/2015 | Vanderheyden et al. | |
| 9,269,375 B2 | 2/2016 | Biskeborn et al. | |
| 9,653,109 B2 | 5/2017 | Biskeborn et al. | |
| 10,490,218 B1 * | 11/2019 | Sieklucki ........... | G11B 5/00852 |

(Continued)

OTHER PUBLICATIONS

Cisco Press, "Storage Networking Fundamentals: Storage Devices", Cisco, Mar. 4, 2005, https://www.ciscopress.com/articles/article.asp?p=372010&seqNum=2.

(Continued)

*Primary Examiner* — Nabil Z Hindi
(74) *Attorney, Agent, or Firm* — Patterson & Sheridan, LLP; Steven H. VerSteeg

(57) ABSTRACT

The present disclosure generally relates to a tape head and a tape drive including a tape head. The tape head comprises a first same gap verify (SGV) head assembly comprising a first media facing surface (MFS) and a plurality of first write transducer and first read transducer pairs, and a second SGV head assembly comprising a second MFS and a plurality of second write transducer and second read transducer pairs. During operation, when a tape or magnetic media moves in a first direction over the tape head, the tape contacts the second MFS and is spaced from the first MFS, and when the tape moves in a second direction opposite the first direction over the tape head, the tape contacts the first MFS and is spaced from the second MFS. As such, the tape contacts only one edge of either the first or second MFS during operation.

22 Claims, 11 Drawing Sheets

(56) References Cited

U.S. PATENT DOCUMENTS 11,056,132 B2 * 7/2021 Biskeborn .............. G11B 5/105
2007/0047122 A1 3/2007 Czarnecki et al.

OTHER PUBLICATIONS

Wang, Zhi et al., "Crossfeed Problems in Read-While-Write Tape Heads", IEEE Transactions on Magnetics, vol. 33, No. 4, Jul. 1997, pp. 2531-2537.

* cited by examiner

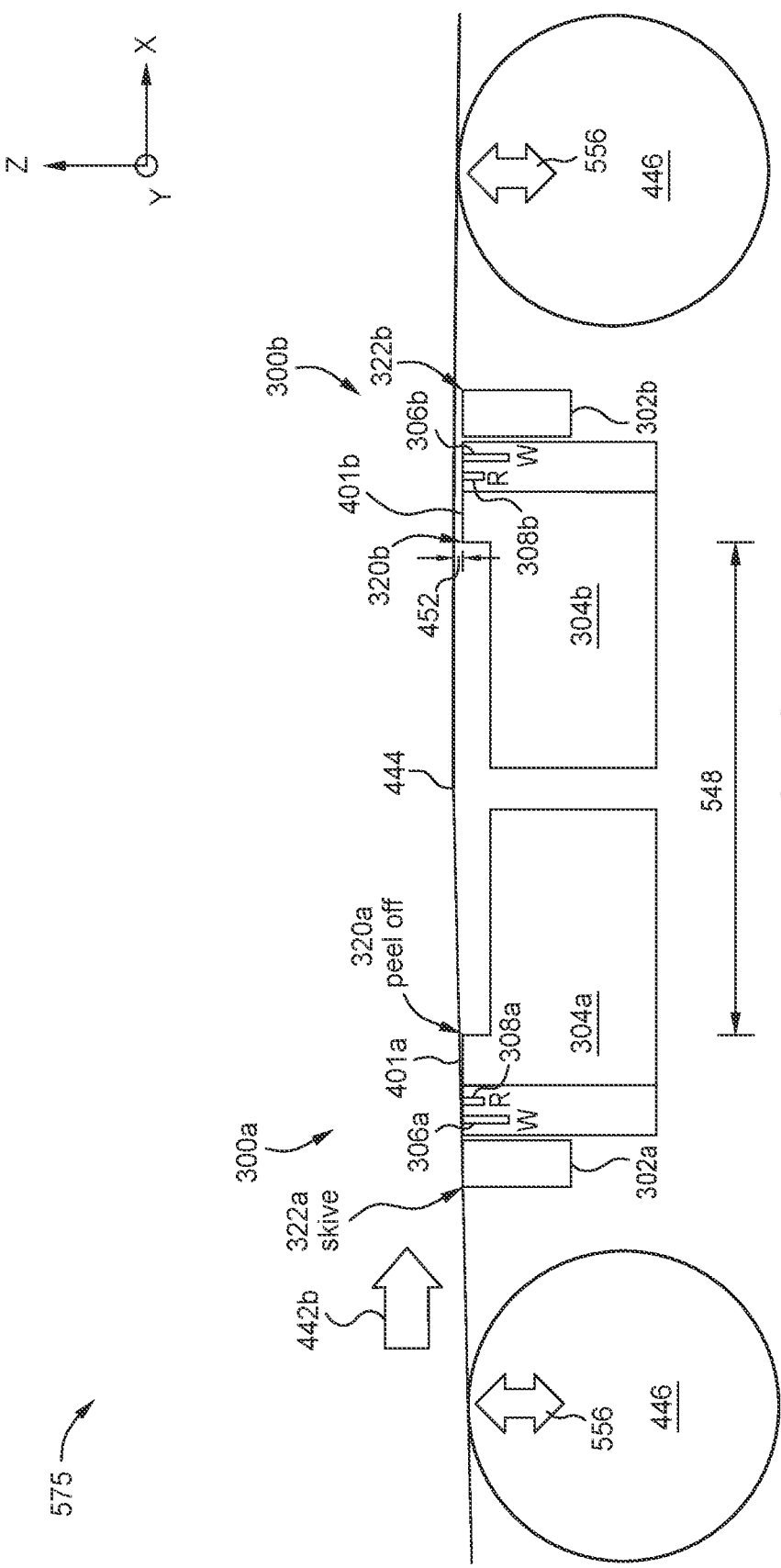

TAPE DRIVE CONFIGURED TO ENABLE MAGNETIC MEDIA TO FLY ABOVE AN UPSTREAM OR A DOWNSTREAM HEAD ASSEMBLY

BACKGROUND OF THE DISCLOSURE

Field of the Disclosure

Embodiments of the present disclosure generally relate to a tape head and a tape drive including a tape head.

DESCRIPTION OF THE RELATED ART

Tape heads of tape drive systems are used to record and read back information on tapes by magnetic processes. Magnetic transducers of the tape heads read data from and write data onto magnetic recording media. Data is written on the magnetic recording media by moving a magnetic write transducer to a position over the media where the data is to be stored. The magnetic write transducer then generates a magnetic field, which encodes the data into the magnetic media. Data is read from the media by similarly positioning the magnetic read transducer and then sensing the magnetic field of the magnetic media.

In a tape drive system, the quantity of data stored on a magnetic tape may be increased by increasing the number of data tracks across the tape that the tape head is capable of writing to. By overlapping portions of data tracks (e.g., shingling data tracks), improvements to data storage quantities can be achieved. However, for various reasons, enabling read-verify for conventional tape heads requires use of two or more separate head structures, where one structure writes the data and the other read-verifies the data. A drawback is that the separate structures in conventional heads must be very precisely assembled to enable this function. Another drawback is that the heads are more susceptible to mis-registration between reader and upstream writer caused by tape skew, as a result of the unavoidable separation between the two. Yet another drawback is the time delay between the writing and the read-verifying may lead to a loss of data due to having to re-write larger blocks of data when an uncorrectable error occurs. Furthermore, the magnetic tape contacts two edges of each media facing surface of each tape head, resulting in increased wear to the magnetic tape and increased wear to the edges of the media facing surfaces.

Therefore, there is a need in the art for a tape head configured to write and read verifying data within a single head structure.

SUMMARY OF THE DISCLOSURE

The present disclosure generally relates to a tape head and a tape drive including a tape head. The tape head comprises a first same gap verify (SGV) head assembly comprising a first media facing surface (MFS) and a plurality of first write transducer and first read transducer pairs, and a second SGV head assembly comprising a second MFS and a plurality of second write transducer and second read transducer pairs. A SGV head assembly is capable of writing data using a write transducer and then immediately reading back the newly-written data using a read transducer. An example tape drive comprising a SGV head assembly is described in co-pending patent application titled "Magnetic Recording Head Having Same-Gap Read-After-Write," U.S. application Ser. No. 17/232,704, filed Apr. 16, 2021, assigned to the same assignee of this application, which is herein incorporated by reference. During operation, when a tape or magnetic media moves in a first direction over the tape head, the tape contacts the second MFS and is spaced from the first MFS, or vice versa, and when the tape moves in a second direction opposite the first direction over the tape head, the tape contacts the first MFS and is spaced from the second MFS, or vice versa. As such, the tape contacts only one edge of either the first or second MFS during operation.

In one embodiment, a tape head comprises a first same gap verify (SGV) head assembly comprising: a first media facing surface having a first internal edge and a first external edge, and a plurality of first write transducer and first read transducer pairs disposed at the first media facing surface, and a second SGV head assembly disposed adjacent to the first SGV head assembly comprising: a second media facing surface having a second internal edge and a second external edge, and a plurality of second write transducer and second read transducer pairs disposed at the second media facing surface, wherein, during operation of the tape head, a magnetic media wraps around either the first internal edge or the second internal edge.

In another embodiment, a tape drive comprises a tape head comprises a first SGV head assembly comprising: a first closure comprising a first closure edge at a first media facing surface, a first substrate disposed adjacent to the first closure, the first substrate comprising a first substrate edge at the first media facing surface, a plurality of first write transducer and first read transducer pairs disposed between the first closure and the first substrate, and a second SGV head assembly disposed adjacent to the first SGV head assembly comprising: a second closure comprising a second closure edge at a second media facing surface, a second substrate disposed adjacent to the second closure, the second substrate comprising a second substrate edge at the second media facing surface, and a plurality of second write transducer and second read transducer pairs disposed between the second closure and the second substrate, a first guide disposed proximate to the first SGV head assembly, and a second guide disposed proximate to the second SGV head assembly, wherein, during operation of the tape head, a magnetic media contacts either the first media facing surface or the second media facing surface depending upon a direction the magnetic media is moving.

In yet another embodiment, a tape drive comprises a tape head comprises a first SGV head assembly comprising: a first media facing surface having a first internal edge and a first external edge, and a plurality of first write transducer and first read transducer pairs disposed at the first media facing surface, and a second SGV head assembly disposed adjacent to the first SGV head assembly comprising: a second media facing surface having a second internal edge and a second external edge, and a plurality of second write transducer and second read transducer pairs disposed at the second media facing surface. The tape drive further comprises a first guide disposed proximate to the first SGV head assembly, the first guide being movable in a first direction and a second direction opposite the first direction, and a second guide disposed proximate to the second SGV head assembly, the second guide being movable in the first direction and the second direction, wherein, when a magnetic media moves in a third direction perpendicular to the first direction during operation of the tape head, the magnetic media is spaced from the first media facing surface, and wherein, when the magnetic media moves in a fourth direction opposite the third direction during operation of the tape head, the magnetic media is spaced from the second media facing surface.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 5A-5E illustrate side views of tape heads comprising two SGV head assemblies and one skiving edge, according to various embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a tape head and a tape drive including a tape head. The tape head comprises a first same gap verify (SGV) head assembly comprising a first media facing surface (MFS) and a plurality of first write transducer and first read transducer pairs, and a second SGV head assembly comprising a second MFS and a plurality of second write transducer and second read transducer pairs. During operation, when a tape or magnetic media moves in a first direction over the tape head, the tape contacts the second MFS and is spaced from the first MFS, or vice versa, and when the tape moves in a second direction opposite the first direction over the tape head, the tape contacts the first MFS and is spaced from the second MFS, or vice versa. As such, the tape contacts only one edge of either the first or second MFS during operation.

Figure 1A:
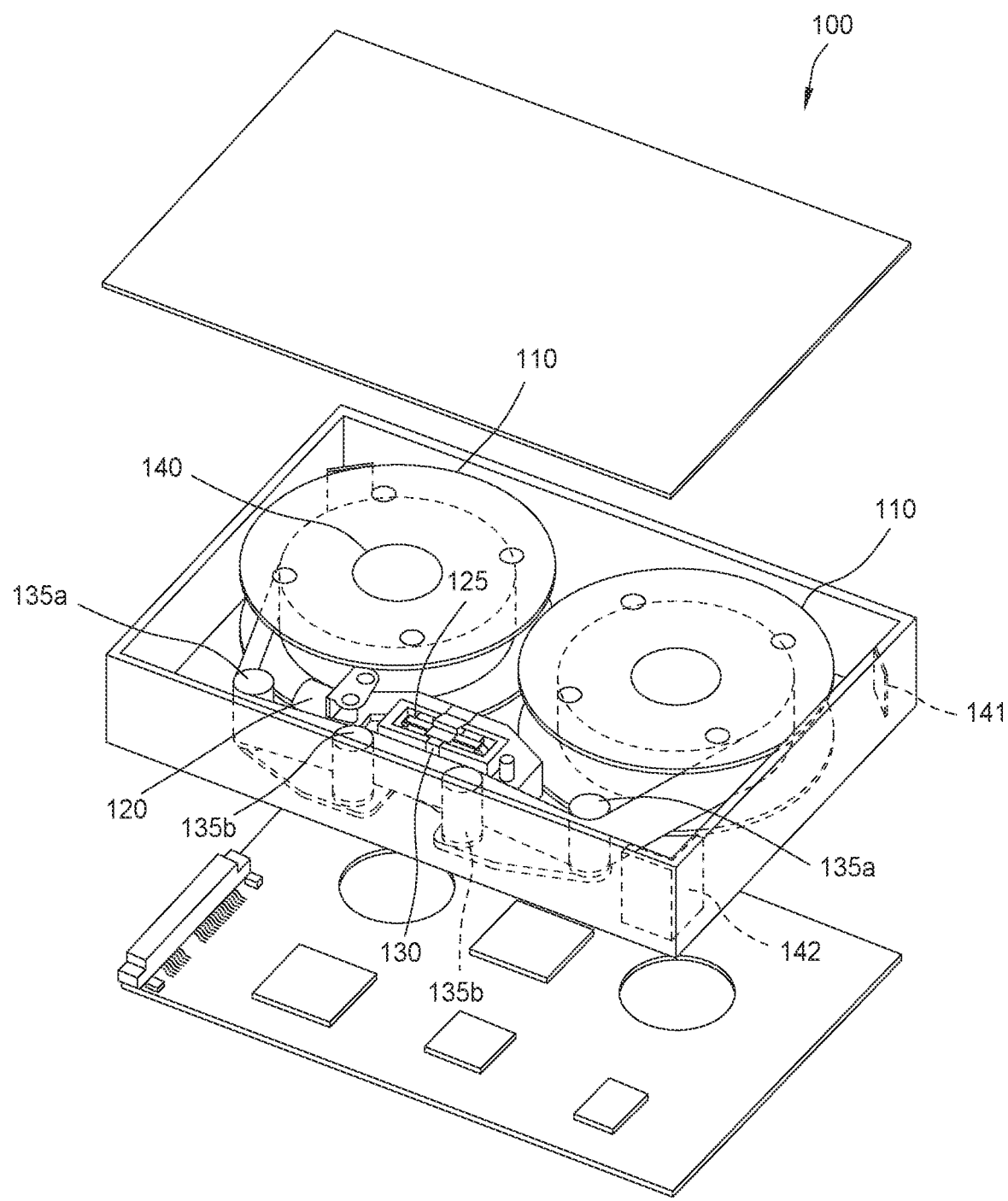
FIGS. 1A-1C illustrate a perspective exploded view, a simplified top down, and side profile view of a tape drive, in accordance with some embodiments.
Figure 1B:
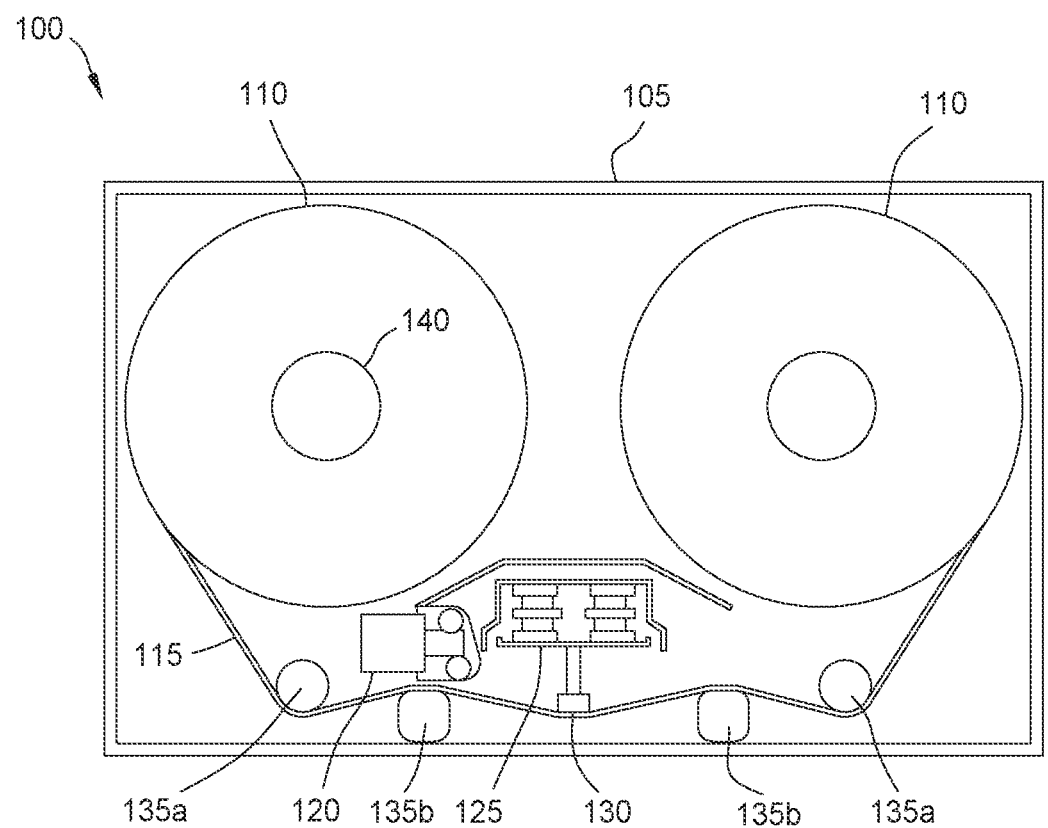
Figure 1C:
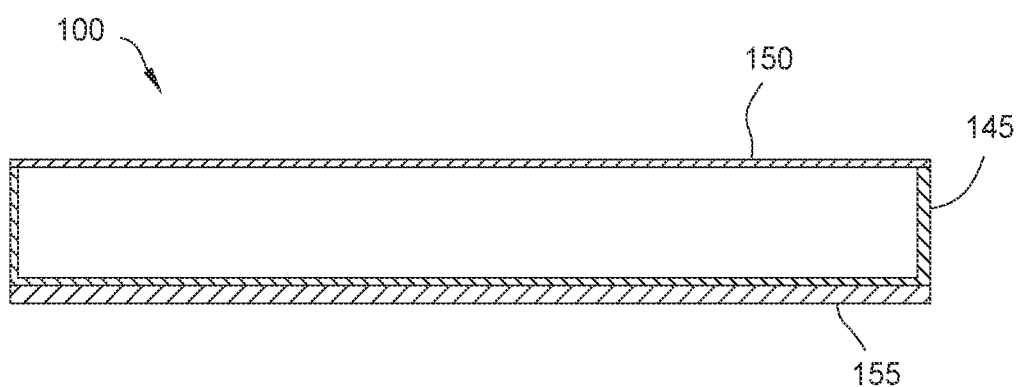

FIGS. 1A-1C illustrate a perspective exploded view, a simplified top down, and side profile view of a tape drive 100, in accordance with some embodiments. The tape drive 100 may be a tape embedded drive (TED). Focusing on FIG. 1B, for example, the tape drive comprises a casing 105, one or more tape reels 110, one or more motors (e.g., a stepping motor 120 (also known as a stepper motor), a voice coil motor (VCM) 125, etc.) a head assembly 130 with one or more read heads and one or more write heads, and tape guides/rollers 135a, 135b. In the descriptions herein, the term "head assembly" may be referred to as "magnetic recording head", interchangeably, for exemplary purposes. Focusing on FIG. 1C, for example, the tape drive further comprises a printed circuit board assembly (PCBA) 155. In an embodiment, most of the components are within an interior cavity of the casing, except the PCBA 155, which is mounted on an external surface of the casing 105. The same components are illustrated in a perspective view in FIG. 1A. In the descriptions herein, the term "tape" may be referred to as "magnetic media", interchangeably, for exemplary purposes.

In the illustrated embodiments, two tape reels 110 are placed in the interior cavity of the casing 105, with the center of the two tape reels 110 on the same level in the cavity and with the head assembly 130 located in the middle and below the two tape reels 110. Tape reel motors located in the spindles of the tape reels 110 can operate to wind and unwind the tape media 115 in the tape reels 110. Each tape reel 110 may also incorporate a tape folder to help the tape media 115 be neatly wound onto the reel 110. One or more of the tape reels 110 may form a part of a removable cartridge and are not necessarily part of the tape drive 100. In such embodiments, the tape drive 100 may not be a tape embedded drive as it does not have embedded media, the drive 100 may instead be a tape drive configured to accept and access magnetic media or tape media 115 from an insertable cassette or cartridge (e.g., an LTO drive), where the insertable cassette or cartridge further comprises one or more of the tape reels 110 as well. In such embodiments, the tape or media 115 is contained in a cartridge that is removable from the drive 100. The tape media 115 may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels 110 are biased against the guides/rollers 135a, 135b (collectively referred to as guides/rollers 135) and are movably passed along the head assembly 130 by movement of the reels 110. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The voice coil motor 125 and stepping motor 120 may variably position the tape head(s) transversely with respect to the width of the recording tape. The stepping motor 120 may provide coarse movement, while the voice coil motor 125 may provide finer actuation of the head(s). In an embodiment, servo data may be written to the tape media to aid in more accurate position of the head(s) along the tape media 115.

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape drive 100 within the casing 105. In particular, as the head mechanism is internal to the casing in certain embodiments, the tape media 115 may not be exposed to the outside of the casing 105, such as in conventional tape drives. Thus, the tape media 115 does not need to be routed along the edge of the casing 105 and can be freely routed in more compact and/or otherwise more efficient ways within the casing 105. Similarly, the head(s) 130 and tape reels 110 may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA 155 is made of solid state electronics, environmental issues are less of a concern, so it does not need to be placed inside the casing 105. That leaves room inside casing 105 for other components, particularly, the moving components and the tape media 115 that would benefit from a more protected environment.

In some embodiments, the tape drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing 105.

In one embodiment, the cover 150 is used to hermetically seal the tape drive. For example, the drive 100 may be hermetically sealed for environmental control by attaching (e.g., laser welding, adhesive, etc.) the cover 150 to the base 145. The drive 100 may be filled by helium, nitrogen, hydrogen, or any other typically inert gas.

In some embodiments, other components may be added to the tape drive 100. For example, a pre-amp for the heads may be added to the tape drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the filters 141 and/or the desiccant 142 may be left out.

In various embodiments, the drive 100 includes controller integrated circuits (IC) (or more simply "a controller") (e.g., in the form of one or more System on Chip (SoC)), along with other digital and/or analog control circuitry to control the operations of the drive. For example, the controller and other associated control circuitry may control the writing and reading of data to and from the magnetic media, including processing of read/write data signals and any servo-mechanical control of the media and head module. In the description below, various examples related to writing and reading and verifying of written data, as well as control of the tape head and media to achieve the same, may be controlled by the controller. As an example, the controller may be configured to execute firmware instructions for the various same gap verify embodiments described below.

Figure 2:
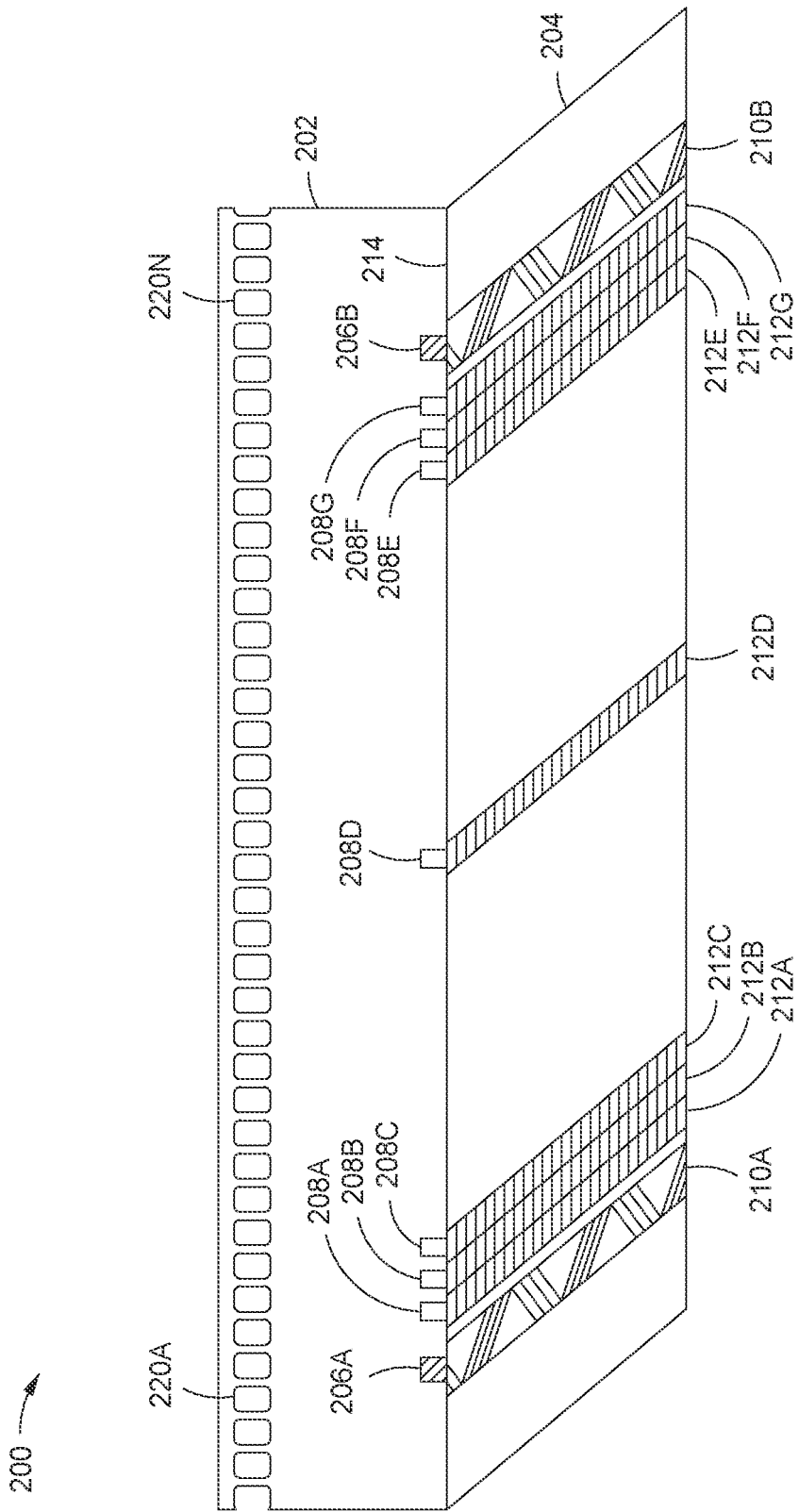
FIG. 2 is a schematic illustration of a tape head and tape that are aligned.

FIG. 2 is a schematic illustration of a tape head module assembly 200 and a tape 204 that are aligned. The tape head module assembly 200 comprises a tape head body 202 that is aligned with the tape 204. The tape 204 moves past the tape head module assembly 200 during read and/or write operations. The tape head module assembly 200 has a media facing surface (MFS) 214 that faces the tape 204.

The tape head body 202 comprises a first servo head 206A and a second servo head 206B spaced therefrom. It is to be understood that while two servo heads have been shown, the disclosure is not limited to two servo heads. Rather, it is contemplated that more or less servo heads may be present. A plurality of data heads 208A-208G is disposed between the first servo head 206A and the second servo head 206B. It is to be understood that while seven data heads have been shown, the disclosure is not limited to seven data heads. Rather, the number of data heads can be more or less than seven, depending on the requirements of the embodiment. For example there can be sixteen, thirty two, sixty four or more data heads utilized in the tape head body 202.

A plurality of pads 220A-220N is electrically coupled to the data head body 202. The plurality of pads 220A-220N coupled to the data head body 202 is not limited to the number shown in FIG. 2. Rather, more or less pads are contemplated. The pads 220A-220N are used to connect the drive electronics to the servo heads 206A, 206B and to data read and writer elements. The pads 220A-220N are used to establish the potential across the servo reader by means of a power supply (not shown) embedded in the tape head 200.

The tape 204 comprises a first servo track 210A and a second servo track 210B. The first servo track 210A and the second servo track 210B are spaced apart allowing the tape head 200 to monitor and control the average position of the data heads 208A-208G relative to the data tracks 212A-212G on the tape 204. It is to be understood that while two servo tracks have been shown, the disclosure is not limited to two servo tracks. Rather, the number of servo tracks can be more or less than two, depending on the requirements of the embodiment.

The tape 204 further comprises a plurality of data tracks 212A-212G disposed between the first servo track 210A and the second servo track 210B. It is to be understood that while seven data tracks have been shown, the disclosure is not limited to the seven data tracks. Rather, the number of data tracks can be more or less than seven, depending on the requirements of the embodiment. In the embodiment of FIG. 2, the first servo head 206A reads its lateral position information (e.g., alignment) over the first servo track 210A. The second servo head 206B is aligned with the second servo track 210B. The combined information allows the servo actuator of the tape drive 200 to align the data heads 208A-208G such that the center data track (e.g., 208D) is centered on tape 204. The plurality of data heads 208A-208G is thus individually aligned with the plurality of data tracks 212A-212N for best case positioning. In this embodiment the first servo head 206B, the second servo head 206B, the first servo track 210A, the second servo track 210B, the plurality of data heads 208A-208G, and the plurality of data tracks 212A-212G are able to read and/or write the data accurately because all are aligned perpendicular to the direction of travel of the tape 204.

Figure 3A:
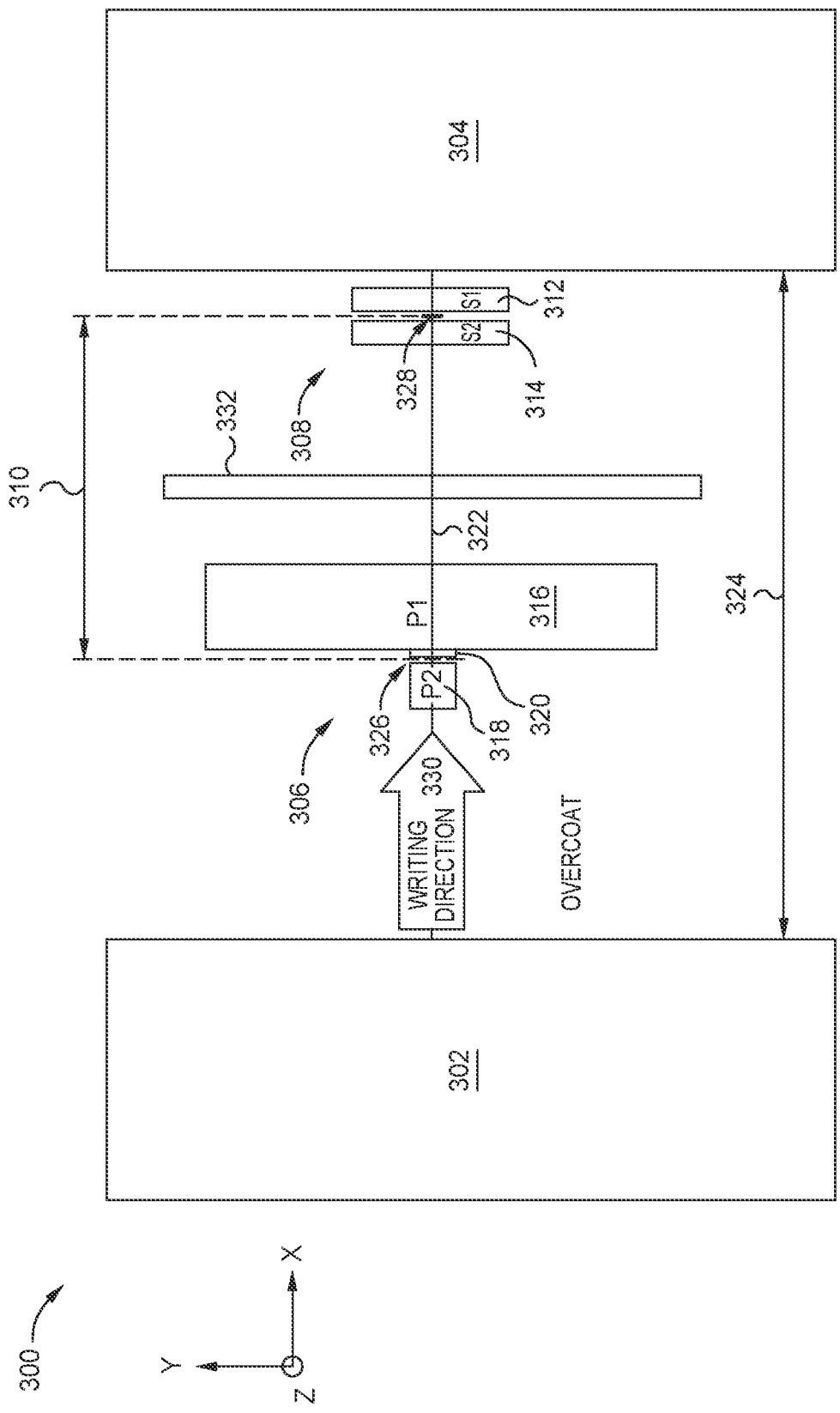
FIGS. 3A-3B illustrate a media facing surface (MFS) view of same gap verify (SGV) head assemblies, according to various embodiments.
Figure 3B:
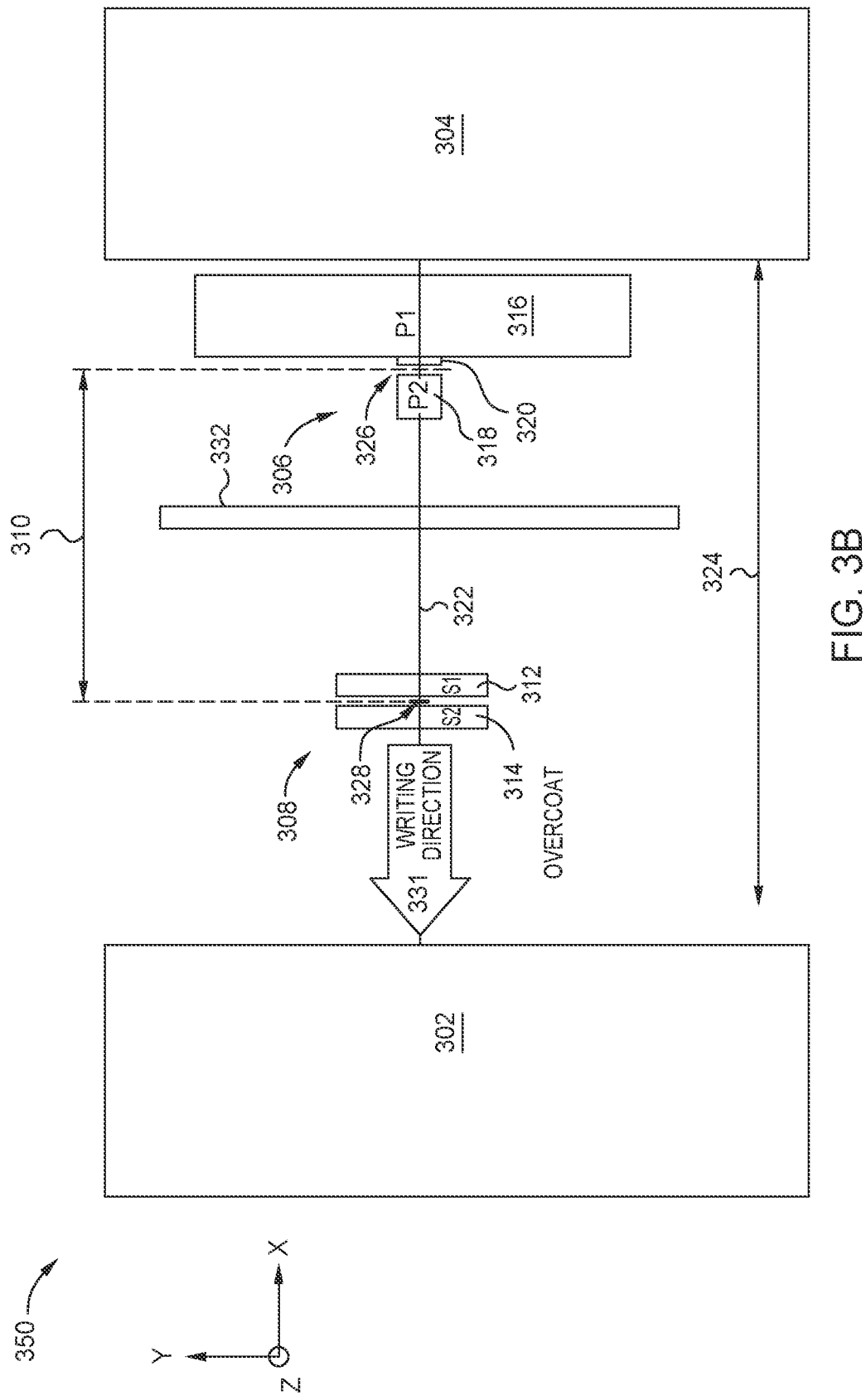

FIGS. 3A-3B illustrate a media facing surface (MFS) view of same gap verify (SGV) head assemblies 300, 350, respectively, according to various embodiments. The SGV head assemblies 300, 350 may be utilized within a tape drive comprising a controller, such as the TED or tape drive 100 of FIG. 1A. The SGV head assemblies 300, 350 may be the tape head module assembly 200 of FIG. 2.

The SGV head assembly 300 comprises a closure 302, one or more write transducers 306 disposed adjacent to the closure 302, one or more read transducers 308 disposed adjacent to the one or more write transducers 306, and a substrate 304 disposed adjacent to the one or more read transducers 308. The SGV head assembly 350 comprises a closure 302, one or more read transducers 308 disposed adjacent to the closure 302, one or more write transducers 306 disposed adjacent to the one or more read transducers 308, and a substrate 304 disposed adjacent to the one or more write transducers 306. Each of the one or more write transducers 306 and the one or more read transducers 308 are disposed on the substrate 304. The write transducer(s) 306 may be referred to as a writer(s) 306, and the read transducer(s) 308 may be referred to as a reader(s) 308.

While only one writer 306 and one reader 308 pair is shown in FIGS. 3A-3B, the SGV head assembly 300 may comprise a plurality of writer 306 and reader 308 pairs, which may be referred to as a head array. For example, in some embodiments, the SGV head assemblies 300, 350 each comprise a head array of 32 writers 306 and 32 readers 308, forming 32 writer 306 and reader 308 pairs, along with one or more servo readers (not shown).

In each of the SGV head assemblies 300, 350, a writer 306 is spaced a distance 310 from a reader 308 of about 5 μm to about 20 μm, such as about 5 μm to about 15 μm. In embodiments comprising a plurality of writer 306 and a plurality of reader 308 pairs, each writer 306 is spaced the distance 310 from an adjacent paired reader 308. The closure 302 is spaced a distance 324 from the substrate 304 of about 20 μm to about 50 μm. In some embodiments, a shield 332 is disposed between the writer 306 and the reader 308 of each pair to reduce cross-talk signals to the reader 308 from the writer 306. The shield 332 may comprise permalloy and may be combined with Ir for wear resistance, for example.

Each of the writers 306 comprises a first write pole P1 316 and a second write pole P2 318. A notch 320 may be disposed on the P1 316. The notch 320 is disposed adjacent to a write gap 326, where the P1 316 is spaced from the P2 318 by a distance in the x-direction at least twice the length of the write gap 326. Each of the readers 308 comprises a first shield S1 312, a second shield S2 314, and a magnetic sensor 328 disposed between the S1 312 and the S2 314. The magnetic sensor 328 may be a tunnel magnetoresistance (TMR) sensor, for example. The write gap 326 and the magnetic sensor 328 are aligned or centered upon a center axis 322 in the y-direction such that the center axis 322 is aligned with a centerline of the write gap 326 and a centerline of the magnetic sensor 328. In embodiments in which the SGV assembly 300 is actively tilted, such as for compensating TDS, the writer 306 and the reader 308 may be offset relative to the center axis. In some embodiments, the distance 310 is measured from the write gap 326 to an MgO layer (not shown) of the magnetic sensor 328.

In the SGV assembly 300 of FIG. 3A, when writing data to a tape or other media, the tape moves over the writer 306 in the writing direction 330 (e.g., in the x-direction). In the SGV assembly 350 of FIG. 3B, when writing data to a tape or other media, the tape moves over the writer 306 in the writing direction 331 (e.g., in the −x-direction). Due at least in part to the distance 310 between the write gap 326 and the magnetic sensor 328 of a writer 306 and reader 308 pair, the writer 306 is able to write to the media, and the reader 308 is able to read the data to verify the data was written correctly. As discussed above, the shield 332 may be used to further reduce magnetic cross-talk between the writer 306 and the reader 308. Thus, the writer 306 is able to write data to a portion of the tape, and the paired reader 308 is able to read verify the newly written portion of the tape immediately. As such, the SGV head assembly 300 is able to write data to and read verify data from a tape concurrently. The SGV head assembly 350, similar constructed, also has this immediate verify capability.

The SGV head assemblies 300, 350 are each able to concurrently write and read data due in part to the separation distance 310 between the write gap 326 and the magnetic sensor 328 of a writer 306 and reader 308 pair. The write gap 326 and magnetic sensor 328 are spaced far enough apart that the amplitude of signals in the reader 308 that arise from coupling of magnetic flux from the paired writer 306 is reduced or substantially less than the readback signal of the reader 308 itself.

As used herein, the SGV head assemblies 300, 350 being able to "concurrently" write and read data refers to the fact that both the writer 306 and the reader 308 are concurrently turned "on" or able to operate simultaneously with respect to various data written to a tape. However, it is to be noted that the writer 306 and the reader 308 are not "concurrently" operating on the same data at the same time. Rather, the writer 306 first writes data, and as the tape moves over the reader 308, the reader 308 is then able to read verify the newly written data as the writer 306 concurrently writes different data to a different portion of the tape. Furthermore, it is to be noted that a controller (not shown) is configured to operate the SGV head assemblies 300, 350, and as such, the controller is configured to independently operate both the writer 306 and the reader 308. Thus, while the writer 306 is described as writing data and the reader 308 is described as reading the data, the controller enables the writer 306 to write and enables the reader 308 to read.

Figure 4:
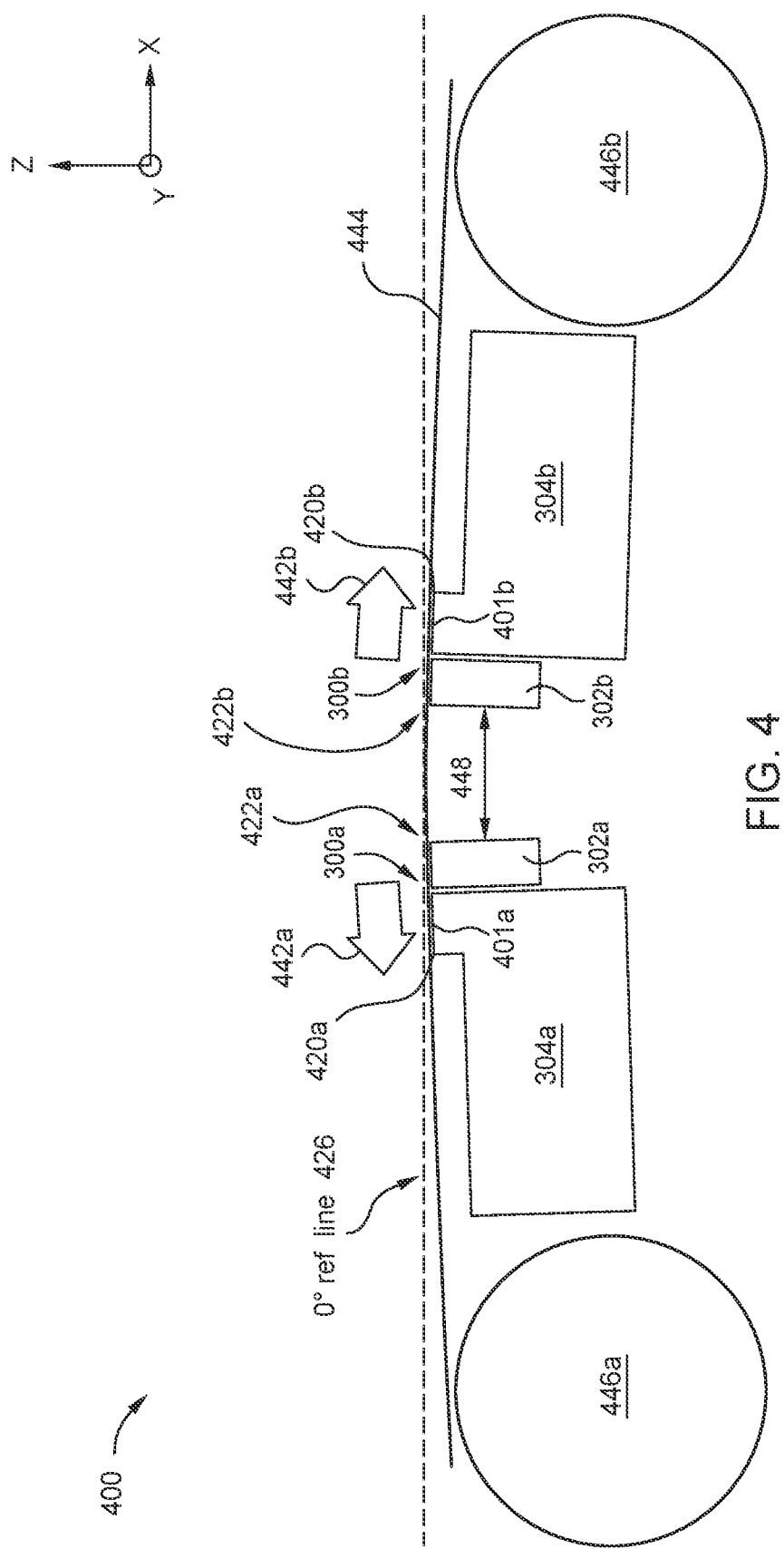
FIG. 4 illustrates a side view of a tape head comprising two SGV head assemblies, according to one embodiment.

FIG. 4 illustrates a side view of a tape head 400 comprising two SGV head assemblies 300a, 300b, according to one embodiment. The tape head 400 comprises a first SGV head assembly 300a and a second SGV head assembly 300b. Each SGV head assembly 300a, 300b may be the SGV head assembly 300 shown in FIG. 3A. The tape head 400 may be the tape head module assembly 200 of FIG. 2. The first SGV head assembly 300a and the second SGV head assembly 300b may be coupled together. In some embodiments, the read and write transducers 308, 306 in the first and second SGV head assemblies 300a, 300b may be aligned, to example, to operate in a legacy mode where one SGV head assembly (e.g., the first SGV head assembly 300a) writes data and the other SGV head assembly (e.g., the second SGV head assembly 300b) reads the data written by the first SGV head assembly 300a. The tape head 400 illustrates a conventional SGV tape head 400 where the tape 444 contacts both the MFS 401a of the first SGV head assembly 300a and the MFS 401b of the second SGV head assembly 300b simultaneously in both directions the tape 444 moves.

In one embodiment, the first SGV head assembly 300*a* comprises a first closure 302*a*, one or more first writers 306 (shown in FIG. 3A) disposed adjacent to the first closure 302*a*, one or more first readers 308 (shown in FIG. 3A) disposed adjacent to the one or more first writers 306, and a first substrate 304*a* disposed adjacent to the one or more first readers 308. Similarly, in such an embodiment, the second SGV head assembly 300*b* comprises a second closure 302*b*, one or more second writers 306 (shown in FIG. 3A) disposed adjacent to the second closure 302*b*, one or more second readers 308 (shown in FIG. 3A) disposed adjacent to the one or more second writers 306, and a second substrate 304*b* disposed adjacent to the one or more second readers 308. The first SGV head assembly 300*a* has a first writing and reading direction 442*a* that is opposite to a second writing and reading direction 442*b* of the second SGV head assembly 300*b*.

In one embodiment, the first SGV head assembly 300*a* and the second SGV head assembly 300*b* are arranged in a face-to-face configuration or arrangement such that the first closure 302*a* of the first SGV head assembly 300*a* is disposed adjacent or proximate to the second closure 302*b* of the second SGV head assembly 300*b*. In other words, the first SGV head assembly 300*a* is a mirror image of the second SGV head assembly 300*b*, the second SGV head assembly 300*b* is a right hand head assembly like that shown in FIG. 3A and the first SGV head assembly 300*a* is a left hand head assembly. The first SGV head assembly 300*a* is spaced a distance 448 from the second SGV head assembly 300*b* of about 100 μm to about 1000 μm.

In other embodiments, the first SGV head assembly 300*a* and the second SGV head assembly 300*b* are arranged in a substrate-to-substrate configuration or reversed configuration, as shown in FIG. 5C, where the first substrate 304*a* is disposed adjacent to the second substrate 304*b*, and tape 444 encounters or passes over either the first closure 302*a* or the second closure 302*b* prior to passing over either the first or second substrate 304*a*, 304*b*, respectively. In such a configuration where the first and second head assemblies 300*a*, 300*b* are arranged like shown in FIG. 3A, the first head assembly 300*a* has the second writing and reading direction 442*b* that is opposite to the first writing and reading direction 442*a* of the second SGV head assembly 300*b*.

Referring to FIG. 4, which shows a conventional SGV tape head 400, a MFS 401*a*, 401*b* of each of the first and second SGV head assemblies 300*a*, 300*b* is configured to support a tape 444 or other magnetic media. The MFS 401*a*, 401*b* of each of the first and second SGV head assemblies 300*a*, 300*b* includes surfaces of the writers 306 and the readers 308 of each SGV head assembly 300*a*, 300*b*. The tape 444 may contact and wrap around a first substrate corner 420*a* and a first closure corner 422*a* of the first SGV head assembly 300*a*, and contact and wrap around a second closure corner 422*b* and a second substrate corner 420*b* of the second SGV head assembly 300*b*, resulting in the tape 444 being bent or angled downwards from a 0° reference line 426 (e.g., parallel to the x-axis). In such a configuration, the tape 444 contacts both the MFS 401*a* and the MFS 401*b* simultaneously in both directions the tape 444 moves.

The contacting and wrapping of the tape 444 at the first and second closure corners 422*a*, 422*b* (i.e., internal wrap angle) may individually cause the tape 444 to be angled or offset from the 0° reference line 426 by about 1.0°±0.2°. Similarly, the contacting and wrapping of the tape 444 at the first and second substrate corners 420*a*, 420*b* (i.e., external wrap angle) may individually cause the tape 444 to be angled or offset from the 0° reference line 426 by about 2.0°±0.2° or about 1.0°±0.2° with respect to the media facing surfaces 401*a*, 401*b*.

The first SGV head assembly 300*a* and the second SGV head assembly 300*b* are both able to independently write and read verify data. For example, a first writer 306 of the first SGV head assembly 300*a* is able to write data to a portion of the tape 444, and an aligned or paired first reader 308 of the first SGV head assembly 300*a* is able to read verify the newly written portion of the tape 444 immediately. Similarly, a second writer 306 of the second SGV head assembly 300*b* is able to write data to a portion of the tape 444, and an aligned or paired second reader 308 of the second SGV head assembly 300*b* is able to read verify the newly written portion of the tape 444 immediately. As such, the first SGV head assembly 300*a* is able to write data to and read verify data from a tape independently from the second SGV head assembly 300*b*, and the second SGV head assembly 300*b* is able to write data to and read verify data from a tape independently from the first SGV head assembly 300*a*.

FIGS. 5A-5E illustrate side views of tape heads 500, 550, 575, 580, 590, respectively, comprising two SGV head assemblies 300*a*, 300*b* and one skiving edge, according to various embodiments. The tape heads 500, 550, 575, 580, 590 may each individually be the tape head module assembly 200 of FIG. 2 or the tape heads 500, 550 may each individually be the tape head 400 of FIG. 4. Each tape head 500, 550, 575, 580, 590 comprises a first SGV head assembly 300*a* and a second SGV head assembly 300*b*. Each SGV head assembly 300*a*, 300*b* of FIGS. 5A-5C may be the SGV head assembly 300 shown in FIG. 3A and each SGV head assembly 350*a*, 350*b* of FIGS. 5D-5E may be the SGV head assembly 350 shown in FIG. 3B.

Figure 5A:
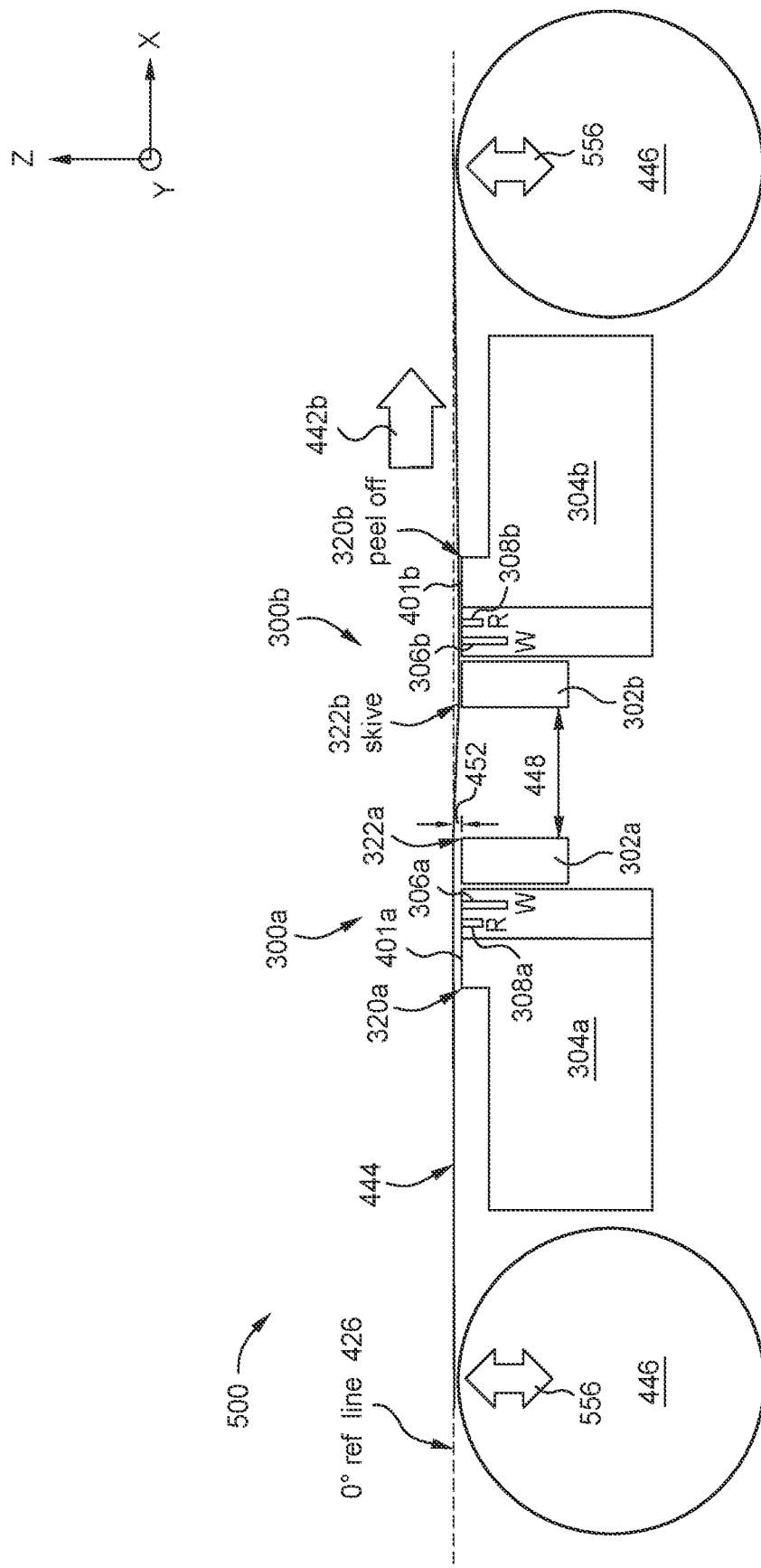
Figure 5B:
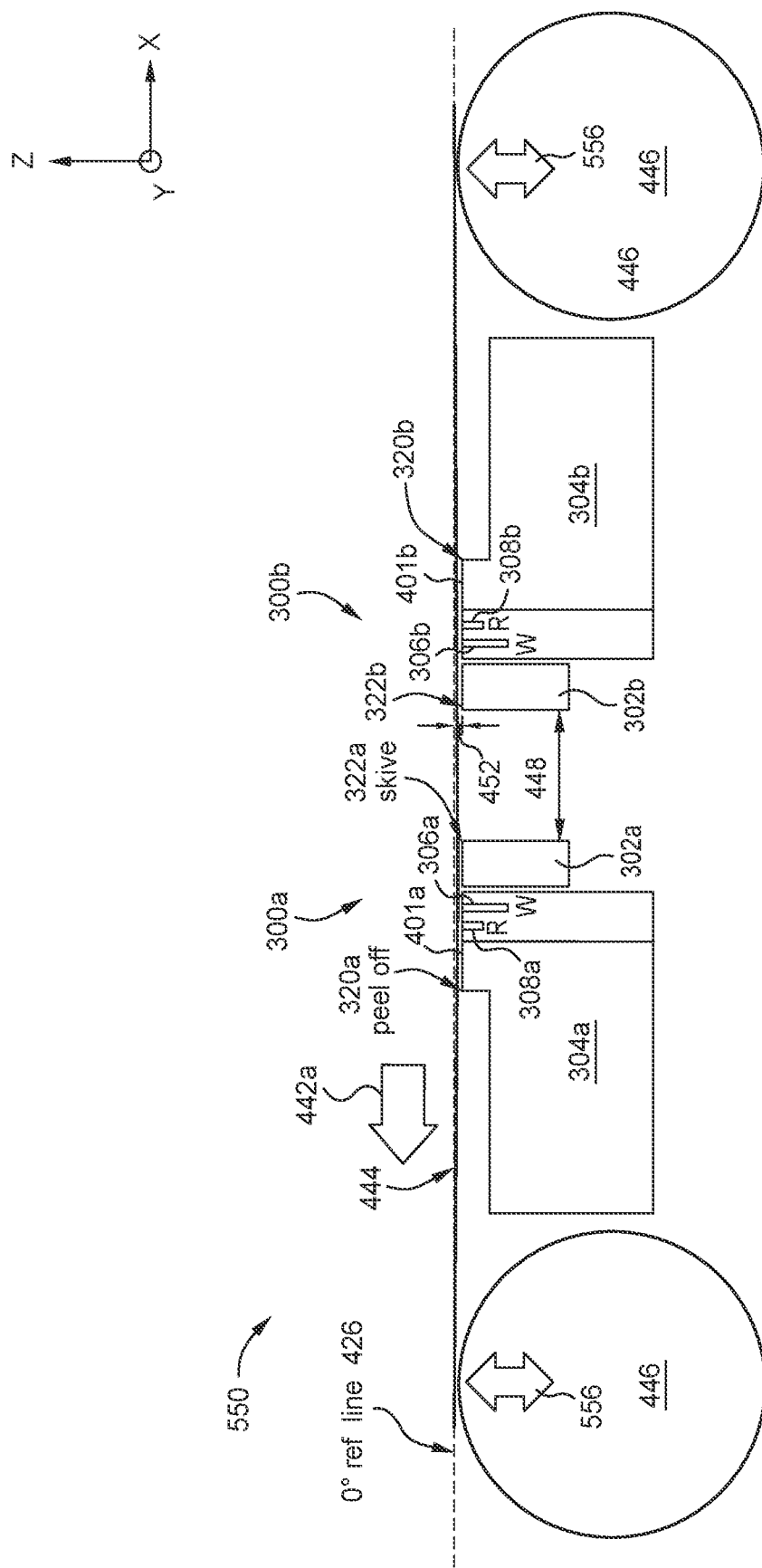

FIGS. 5A-5B illustrate the SGV head assemblies 300*a*, 300*b* in a face-to-face configuration, whereas FIG. 5C illustrates the SGV head assemblies 300*a*, 300*b* a substrate-to-substrate configuration or reversed configuration. FIGS. 5A and 5C illustrate the tape 444 moving in a first or forward direction (i.e., the x-direction), and FIG. 5B illustrates the tape 444 moving in a second or reverse direction (i.e., the −x-direction). The tape heads 500, 550 of FIGS. 5A-5B may be the same tape head; however, the tape 444 moves in opposite directions in FIGS. 5A-5B. The SGV head assemblies 300*a*, 300*b* of FIGS. 5A-5C illustrate the first writer 306*a* being disposed adjacent to the first closure 302*a*, the first reader 308*a* being disposed between the first writer 306*a* and the first substrate 304*a*, the second writer 306*b* being disposed adjacent to the second closure 302*b*, and the second reader 308*b* being disposed between the second writer 306*b* and the second substrate 304*b*, like shown in FIG. 3A above.

The first SGV head assembly 300*a* and the second SGV head assembly 300*b* may be coupled together, for example, by joining to a common feature, such as a block, beam, etc. In some embodiments, the MFS's 401*a*, 401*b* of the SGV head assemblies 300*a*, 300*b* are aligned to one another before coupling the SGV head assemblies 300*a*, 300*b* together. In other embodiments, the SGV head assemblies 300*a*, 300*b* may be independently joined to beams and then aligned and coupled together at an angle of between about 0° to about 2°, dependent on whether the guides 446 are active.

In FIG. 5A, the tape 444 is moving in the x-direction such that the tape 444 passes over the first SGV head assembly 300*a* (e.g., the upstream SGV head assembly) before passing over the second SGV head assembly 300*b* (e.g., the downstream SGV head assembly). As such, the second SGV head assembly 300b writes and reads data as the tape 444 moves in the second direction 442b (i.e., the x-direction) while the first SGV head assembly 300a is not currently reading or writing. As the tape head 500 operates with the tape 444 moving the in the x-direction, the tape 444 flies over the upstream or first SGV head assembly 300a such that the tape 444 is spaced a distance 452 from the MFS 401a.

The distance 452 between the MFS 401a and the tape 444 is between about 0.2 μm to about 2.0 μm. The tape 444 may have an external wrap angle over the first substrate corner 320a of about 0.1° to about 0.7°, which helps enable the non-contacting operation of the tape 444 on the first SGV head assembly 300a. An internal wrap angle of the tape 444 between the first SGV head assembly 300a and the second SGV head assembly 300b is about 0.8° to about 1.3° with respect to the 0° reference line.

The tape 444 contacts the MFS 401b of the second SGV head assembly 300b, enabling the second SGV head assembly 300b to write and read data from the tape 444, due in part to a vacuum effect between the second SGV head assembly 300b and the tape 444 created by the internal wrap angle between the tape 444 and the second closure corner 322b. The second closure corner 322b is a skiving edge, which allows the tape 444 to wrap around the second closure corner 322b to contact the MFS 401b. The internal wrap angle between the tape 444 and the second closure corner 322b is about 0.5° to about 1.3°, which helps enable the contacting of the tape 444 on the second SGV head assembly 300b. The tape 444 then peels off before the second substrate corner 320b, i.e., without wrapping around the second substrate corner 320b. As such, the tape head 500 has only one skiving edge, the second closure corner 322b, rather than four skiving edges as for conventional tape heads, such as the tape head 400 of FIG. 4.

The separation distance 448 between the first and second SGV head assemblies 300a, 300b determines how precisely the vertical offset (i.e., in the z-direction) between the SGV head assemblies 300a, 300b will be set to enable the tape 444 to fly over the first SGV head assembly 300a and to contact the second SGV head assembly 300b. For example, to achieve a wrap angle tolerance of about ±0.1° when the offset tolerance is at about 2 μm, the minimum separation distance 448 is about 550 μm. Moreover, the tape head 500 of FIG. 5A is able to operate in legacy mode, such as by increasing the external wrap angle enough.

In FIG. 5B, the tape 444 is moving in the −x-direction such that the tape 444 passes over the second SGV head assembly 300b (e.g., the upstream SGV head assembly) before passing over the first SGV head assembly 300a (e.g., the downstream SGV head assembly). As such, the first SGV head assembly 300a reads and writes data as the tape 444 moves in the first direction 442a (i.e., the −x-direction) while the second SGV head assembly 300b is not currently writing or reading. As the tape head 550 operates with the tape 444 moving the in the −x-direction, the tape 444 flies over the upstream or second SGV head assembly 300b such that the tape 444 is spaced a distance 452 from the MFS 401b.

The distance 452 between the MFS 401b and the tape 444 is between about 0.2 μm to about 2.0 μm. The tape 444 may have an external wrap angle over the first substrate corner 320b of about 0.1° to about 0.7°, which helps enable the non-contacting operation of the tape 444 on the first SGV head assembly 300a. An internal angle between the first SGV head assembly 300a and the second SGV head assembly 300b is about 0.5° to about 1.3° with respect to the 0° reference line.

The tape 444 contacts the MFS 401a of the first SGV head assembly 300a, enabling the first SGV head assembly 300a to read and write data from the tape 444, due in part to a vacuum effect between the first SGV head assembly 300a and the tape 444 created by an internal wrap angle between the tape 444 and the first closure corner 322a. The first closure corner 322a is a skiving edge, which allows the tape 444 to wrap around the first closure corner 322a to contact the MFS 401a. The internal wrap angle between the tape 444 and the first closure corner 322a is about 0.5° to about 1.3°, which helps enable the contacting of the tape 444 on the first SGV head assembly 300a. The tape 444 then peels off before the first substrate corner 320a, i.e., without wrapping around the first substrate corner 320a. As such, the tape head 550 has only one skiving edge, the first closure corner 322a, rather than four skiving edges as for conventional tape heads, such as the tape head 400 of FIG. 4.

The separation distance 448 between the first and second SGV head assemblies 300a, 300b determines how precisely the vertical offset (i.e., in the z-direction) between the SGV head assemblies 300a, 300b will be set to enable the tape 444 to fly over the second SGV head assembly 300b and to contact the first SGV head assembly 300a. For example, to achieve a wrap angle tolerance of about ±0.1° when the offset tolerance is at about 2 μm, the minimum separation distance 448 is about 550 μm. Moreover, the tape head 550 of FIG. 5B is able to operate in legacy mode.

In FIG. 5C, the tape 444 is moving in the x-direction such that the tape 444 passes over the first SGV head assembly 300a (e.g., the upstream SGV head assembly) before passing over the second SGV head assembly 300b (e.g., the downstream SGV head assembly). As such, the first SGV head assembly 300a writes and reads data as the tape 444 moves in the second direction 442b (i.e., the x-direction) while the second SGV head assembly 300b is not currently reading or writing. The MFS 401a, 401b of each SGV head assembly 300a, 300b may be angled downward between about 0° to about 0.7° with respect to the 0° reference line.

As the tape head 575 operates with the tape 444 moving the in the x-direction, the tape 444 contacts the MFS 401a of the first SGV head assembly 300a, enabling the first SGV head assembly 300a to read and write data from the tape 444, due in part to a vacuum effect between the first SGV head assembly 300a and the tape 444. The first closure corner 322a is a skiving edge, which allows the tape 444 to wrap around the first closure corner 322a to contact the MFS 401a. The tape 444 then peels off before the first substrate corner 320a, i.e., without wrapping around the first substrate corner 320a.

The tape 444 flies over the downstream or second SGV head assembly 300b such that the tape 444 is spaced a distance 452 from the MFS 401b. The distance 452 between the MFS 401b and the tape 444 is between about 0.2 μm to about 2.0 μm. The tape 444 may have an external wrap angle around the first closure corner 322a of about 0.5° to about 1.3° with respect to the MFS 401a. As such, the tape head 575 has only one skiving edge, the first closure corner 322a, rather than four skiving edges as for conventional tape heads, such as the tape head 400 of FIG. 4.

The MFS 401a of the first SGV head assembly 300a and the MFS 401b of the second SGV head assembly 300b are spaced a distance 548 of about 1 mm to about 2 mm apart. The distance 548 between the MFS 401a of the first SGV head assembly 300a and the MFS 401b of the second SGV head assembly 300b determines how precisely the vertical offset (i.e., in the z-direction) between the SGV head assemblies 300a, 300b will be set to enable the tape 444 to contact the first SGV head assembly 300a and to fly over the second SGV head assembly 300b. For example, to achieve a wrap angle tolerance of about ±0.1° when the offset tolerance is at about 2 µm, the minimum separation distance 448 is about 550 µm.

Figure 5D:
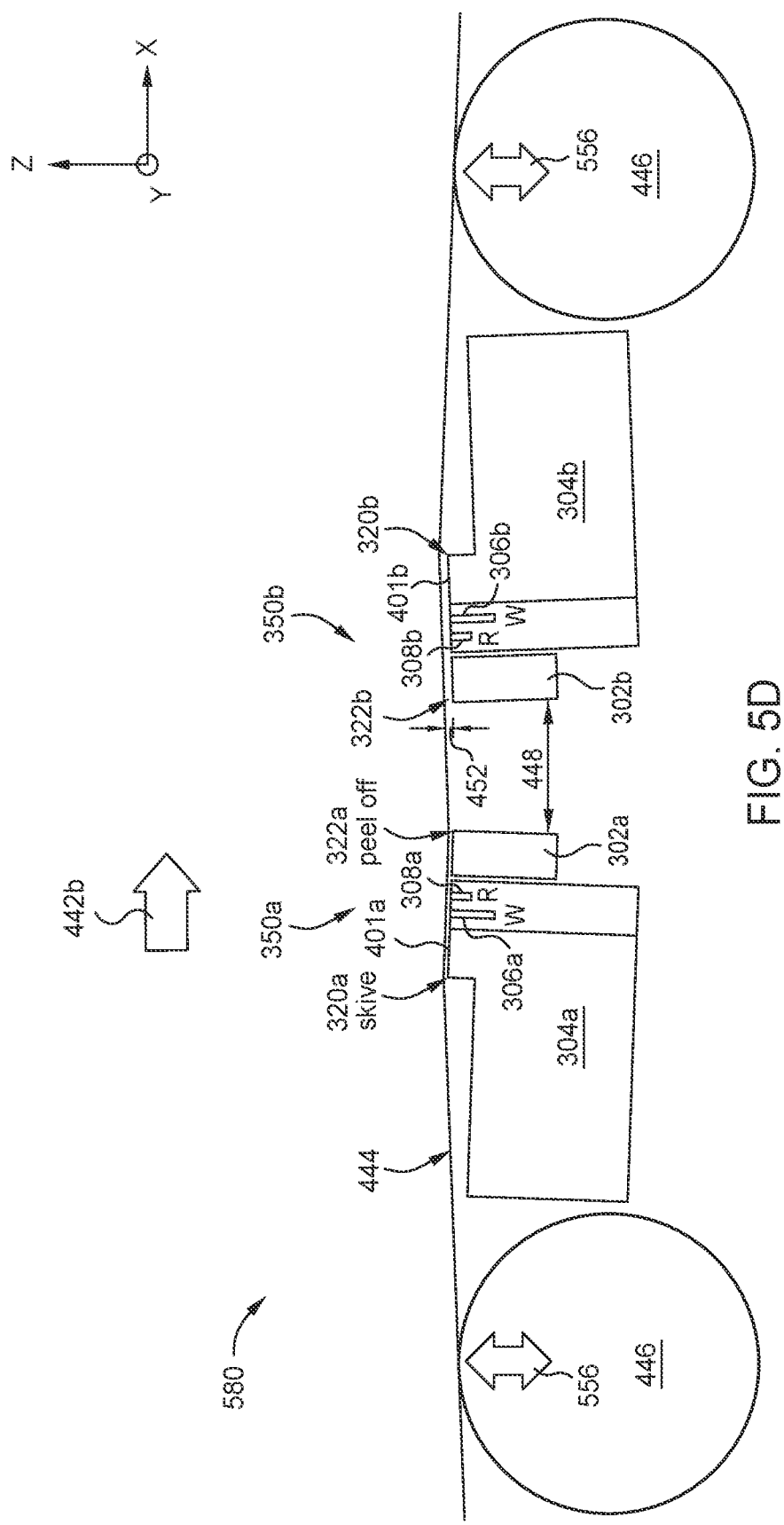
Figure 5E:
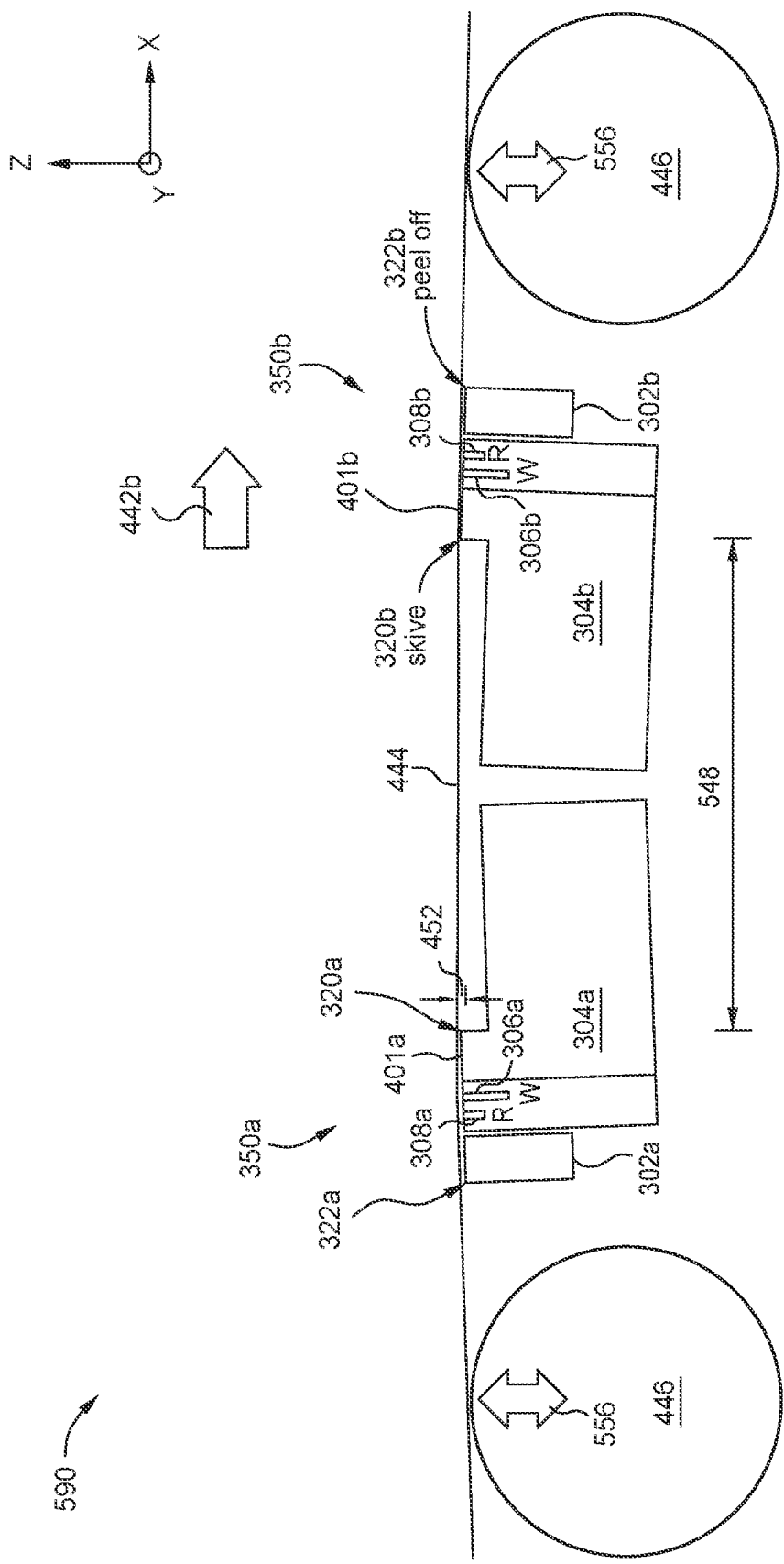

FIG. 5D illustrates the SGV head assemblies 350a, 350b in a closure-to-closure configuration, whereas FIG. 5E illustrates the SGV head assemblies 350a, 350b a substrate-to-substrate configuration or reversed configuration. FIGS. 5D-5E illustrate the tape 444 moving in a first or forward direction 442b (i.e., the x-direction). The SGV head assemblies 350a, 350b of FIGS. 5D-5E illustrate the first writer 306a being disposed adjacent to the first substrate 304a, the first reader 308a being disposed between the first writer 306a and the first closure 302a, the second writer 306b being disposed adjacent to the second substrate 304b, and the second reader 308b being disposed between the second writer 306b and the second closure 302b, like shown in FIG. 3B above.

The first SGV head assembly 350a and the second SGV head assembly 350b may be coupled together, for example, by joining to a common feature, such as a block, beam, etc. In some embodiments, the MFS's 401a, 401b of the SGV head assemblies 350a, 350b are aligned to one another before coupling the SGV head assemblies 350a, 350b together. In other embodiments, the SGV head assemblies 350a, 350b may be independently joined to beams and then aligned and coupled together.

In FIG. 5D, the tape 444 is moving in the x-direction such that the tape 444 passes over the first SGV head assembly 350a (e.g., the upstream SGV head assembly) before passing over the second SGV head assembly 350b (e.g., the downstream SGV head assembly). The first SGV head assembly 350a writes and reads data as the tape 444 moves in the x-direction (i.e., the second direction 442b) while the second SGV head assembly 350b is not currently reading or writing. As the tape head 580 operates with the tape 444 moving in the x-direction, the tape 444 flies over the second SGV head assembly 350b such that the tape 444 is spaced a distance 452 from the MFS 401b.

The distance 452 between the MFS 401b and the tape 444 is between about 0.2 µm to about 2.0 µm. An external wrap angle around the first substrate corner 320a of about 0.8° to about 1.3° with respect to the MFS 401a.

The tape 444 contacts the MFS 401b of the first SGV head assembly 350a, enabling the first SGV head assembly 350a to read and write data from the tape 444, due in part to a vacuum effect between the first SGV head assembly 350a and the tape 444 created by the external wrap angle between the tape 444 and the first substrate corner 320a. The first substrate corner 320a is a skiving edge, which allows the tape 444 to wrap around the first substrate corner 320a to contact the MFS 401b. The head angle is about 0° to about 0.7°, which ensures the tape 444 peels off the first closure corner 322a. The tape 444 then peels off before the first closure corner 322a, i.e., without wrapping around the first closure corner 322a. As such, the tape head 580 has only one skiving edge, the first substrate corner 320a, rather than four skiving edges as for conventional tape heads, such as the tape head 400 of FIG. 4.

The separation distance 448 between the first and second SGV head assemblies 350a, 350b determines how precisely the vertical offset (i.e., in the z-direction) between the SGV head assemblies 350a, 350b will be set to enable the tape 444 to contact the first SGV head assembly 350a and to fly over the second SGV head assembly 350b.

In FIG. 5E, the tape 444 is moving in the x-direction such that the tape 444 passes over the first SGV head assembly 350a (e.g., the upstream SGV head assembly) before passing over the second SGV head assembly 350b (e.g., the downstream SGV head assembly). As such, the second SGV head assembly 350b writes and reads data as the tape 444 moves in the second direction 442b (i.e., the x-direction) while the first SGV head assembly 350a is not currently reading or writing.

As the tape head 590 operates with the tape 444 moving the in the x-direction, the tape 444 flies over the MFS 401a of the first SGV head assembly 350a and contacts the MFS 401b of the second SGV head assembly 350a, enabling the second SGV head assembly 350b to write and read data from the tape 444, due in part to a vacuum effect between the second SGV head assembly 350b and the tape 444. The second substrate corner 320b is a skiving edge, which allows the tape 444 to wrap around the second substrate corner 320b to contact the MFS 401b. The tape 444 then peels off before the second closure corner 322b, i.e., without wrapping around the second closure corner 322b.

The tape 444 flies over the upstream or first SGV head assembly 350a such that the tape 444 is spaced a distance 452 from the MFS 401a. The distance 452 between the MFS 401a and the tape 444 is between about 0.2 µm to about 2.0 µm. The tape 444 has an external wrap angle of about 0.1° to about 0.7° with respect to the 0° reference line. The head is angled about 1.0°±0.2°, which helps enable the non-contacting operation of the tape 444 on the first SGV head assembly 350a and the contacting of the tape 444 on the second SGV head assembly 350b 300a. As such, the tape head 590 has only one skiving edge, the second substrate corner 350b, rather than four skiving edges as for conventional tape heads, such as the tape head 400 of FIG. 4.

The MFS 401a of the first SGV head assembly 350a and the MFS 401b of the second SGV head assembly 350b are spaced a distance 548 of about 1 mm to about 2 mm apart. The distance 548 between the MFS 401a of the first SGV head assembly 350a and the MFS 401b of the second SGV head assembly 350b determines how precisely the vertical offset (i.e., in the z-direction) between the SGV head assemblies 350a, 350b will be set to enable the tape 444 to contact the second SGV head assembly 350b and to fly over the first SGV head assembly 350a. For example, to achieve a wrap angle tolerance of about ±0.1° when the offset tolerance is at about 2 µm, the minimum separation distance 448 is about 550 µm. Moreover, the tape head 590 of FIG. 5E is able to operate in legacy mode when the external tape wrap angle is increased.

While the MFS 401a, 401b of each of the first and second SGV head assemblies 350a, 350b is shown tilted with respect to the 0° reference line 426 in FIGS. 5D-5E, the MFS 401a, 401b may be parallel to the 0° reference line 426, like shown in FIGS. 5A-5B.

In each of the tape heads 500, 550, 575, 580, 590, the guides 446 supporting the tape 444 are independently movable in the z-direction and the −z-direction, as indicated by the arrows 556. A controller (not shown) of each tape head 500, 550, 575, 580, 590 may be configured to move the guides 446 independently. As such, the guide 446 disposed adjacent or proximate to the first SGV head assembly 300a or 350a may be offset from the guide 446 disposed adjacent or proximate to the second SGV head assembly 300b or 350b. The guides 446 are independently movable to assist the tape 444 to fly over the upstream or first SGV head assembly 300*a* or 350*a* and to contact the MFS 401*b* of the downstream or second SGV head assembly 300*b* or 350*b*, or vice versa. In some embodiments, the guides 446 are adjusted or actuated dynamically by tape drive firmware (not shown) to enable the tape 444 to fly over the upstream or first SGV head assembly 300*a* or 350*a*. In other embodiments, the guides 446 are adjusted or actuated in a factory setting. In yet other embodiments, the guides 446 may be stationary. The guides 446 may be adjusted to enable legacy mode in the tape heads 500, 550, and 590 of FIGS. 5A, 5B, and 5E.

Additionally, in some embodiments, the SGV head assemblies 300*a*, 300*b*, 350*a*, 350*b* themselves may be movable in the z-direction and the −z-direction (e.g., shown by arrows 556) to assist the tape 444 to fly over the upstream or first SGV head assembly 300*a* or 350*a* and to contact the MFS 401*b* of the downstream or second SGV head assembly 300*b* or 350*b*, or vice versa. A controller (not shown) of each tape head 500, 550, 575, 580, 590 may be configured to move the SGV head assemblies 300*a*, 300*b*, 350*a*, 350*b*. As such, the first SGV module 300*a* or 350*a* may be offset in the y-direction from the second SGV head assembly 300*b* or 350*b*. In some embodiments, the SGV head assemblies 300*a*, 300*b*, 350*a*, 350*b* are adjusted or actuated dynamically by tape drive firmware (not shown) to enable the tape 444 to fly over the upstream or first SGV head assembly 300*a* or 350*a*. In other embodiments, the SGV head assemblies 300*a*, 300*b*, 350*a*, 350*b* are adjusted or actuated in a factory setting. In yet other embodiments, the SGV head assemblies 300*a*, 300*b*, 350*a*, 350*b* may be stationary.

Since the tape heads 500, 550, 575, 580, 590 of FIGS. 5A-5E each has only one skiving edge, as compared to four wrapped edges in conventional SGV tape heads, like the tape head 400 of FIG. 4, the tape 444 receives about four-times (4x) less wear than conventional tape heads, protecting the tape 444 and the data stored thereon as well as prolonging the life of the tape 444. Moreover, the various edges or corners of the SGV head assemblies 300*a*, 300*b*, 350*a*, 350*b* are better protected, receiving less wear, enabling the overall life of the tape heads 500, 550, 575, 580, 590 to be prolonged. Furthermore, since the tape 444 does not contact at least one MFS 401*a*, 401*b* of one SGV head assembly (e.g., the first SGV head assembly 300*a* in the tape head 500, the second SGV head assembly 300*b* in the tape heads 550, 575, the second SGV head assembly 350*b* in the tape head 580, and the first SGV head assembly 350*a* in the tape head 590), the tape heads 500, 550, 575, 580, 590 have about a 50% lower contact duty cycle, and lower running friction.

In one embodiment, a tape head comprises a first same gap verify (SGV) head assembly comprising: a first media facing surface having a first internal edge and a first external edge, and a plurality of first write transducer and first read transducer pairs disposed at the first media facing surface, and a second SGV head assembly disposed adjacent to the first SGV head assembly comprising: a second media facing surface having a second internal edge and a second external edge, and a plurality of second write transducer and second read transducer pairs disposed at the second media facing surface, wherein, during operation of the tape head, a magnetic media wraps around either the first internal edge or the second internal edge.

The first SGV head assembly is controllable to write data to the magnetic media using the first write transducer of each pair and read verify the data using the first read transducer of each pair. The second SGV head assembly is controllable to write data to the magnetic media using the second write transducer of each pair and read verify the data using the second read transducer of each pair. The magnetic media wraps around one of the first internal edge or the first external edge at an angle of about 0.5° to about 1.3° with respect to the first media facing surface. When the magnetic media wraps around the first internal edge, the magnetic media is spaced from the second media facing surface. When the magnetic media wraps around the second internal edge, the magnetic media is spaced from the first media facing surface. The magnetic media is spaced from either the first media facing surface or the second media facing surface a distance of about 0.2 µm to about 2.0 µm. The first SGV head assembly and the second SGV head assembly are arranged in a closure-to-closure configuration. The first SGV head assembly is spaced from the second SGV head assembly a distance of about 100 µm to about 1500 µm.

A tape drive comprises the tape head, and a controller configured to: control the first SGV module head assembly to write data to the magnetic media using the plurality of first write transducers and read verify the data using the plurality of first read transducers, and control the second SGV module head assembly to write data to the magnetic media using the plurality of second write transducers and read verify the data using the plurality of second read transducers.

In another embodiment, a tape drive comprises a tape head comprises a first SGV head assembly comprising: a first closure comprising a first closure edge at a first media facing surface, a first substrate disposed adjacent to the first closure, the first substrate comprising a first substrate edge at the first media facing surface, a plurality of first write transducer and first read transducer pairs disposed between the first closure and the first substrate, and a second SGV head assembly disposed adjacent to the first SGV head assembly comprising: a second closure comprising a second closure edge at a second media facing surface, a second substrate disposed adjacent to the second closure, the second substrate comprising a second substrate edge at the second media facing surface, and a plurality of second write transducer and second read transducer pairs disposed between the second closure and the second substrate, a first guide disposed proximate to the first SGV head assembly, and a second guide disposed proximate to the second SGV head assembly, wherein, during operation of the tape head, a magnetic media contacts either the first media facing surface or the second media facing surface depending upon a direction the magnetic media is moving.

The first SGV head assembly is controllable to write data to the magnetic media using the first write transducer of each pair and read verify the data using the first read transducer of each pair. The second SGV head assembly is controllable to write data to the magnetic media using the second write transducer of each pair and read verify the data using the second read transducer of each pair. The first and second guides are independently movable in a direction perpendicular to the direction the magnetic media moves. The first SGV head assembly and the second SGV head assembly are arranged in a closure-to-closure configuration. The magnetic media wraps around the first closure edge when the tape moves in a first direction. The magnetic media wraps around the second closure edge when the tape moves in a second direction opposite the first direction. When the magnetic media moves in the first direction, the magnetic media contacts the first media facing surface and is spaced from the second media facing surface. When the magnetic media moves in the second direction, the magnetic media contacts the second media facing surface and is spaced from the first media facing surface.

The first SGV head assembly and the second SGV head assembly are arranged in a reverse configuration. The magnetic media wraps around the first closure edge when the tape moves in a first direction. The magnetic media wraps around the second closure edge when the tape moves in a second direction opposite the first direction. When the magnetic media moves in the first direction, the magnetic media contacts the first media facing surface and is spaced from the second media facing surface. When the magnetic media moves in the second direction, the magnetic media contacts the second media facing surface and is spaced from the first media facing surface. The first media facing surface is spaced a distance of about 1 mm to about 2 mm from the second media facing surface.

The tape drive further comprises a controller configured to: control the first SGV module head assembly to write data to the magnetic media using the plurality of first write transducers and read verify the data using the plurality of first read transducers, and control the second SGV module head assembly to write data to the magnetic media using the plurality of second write transducers and read verify the data using the plurality of second read transducers.

In yet another embodiment, a tape drive comprises a tape head comprises a first SGV head assembly comprising: a first media facing surface having a first internal edge and a first external edge, and a plurality of first write transducer and first read transducer pairs disposed at the first media facing surface, and a second SGV head assembly disposed adjacent to the first SGV head assembly comprising: a second media facing surface having a second internal edge and a second external edge, and a plurality of second write transducer and second read transducer pairs disposed at the second media facing surface. The tape drive further comprises a first guide disposed proximate to the first SGV head assembly, the first guide being movable in a first direction and a second direction opposite the first direction, and a second guide disposed proximate to the second SGV head assembly, the second guide being movable in the first direction and the second direction, wherein, when a magnetic media moves in a third direction perpendicular to the first direction during operation of the tape head, the magnetic media is spaced from the first media facing surface, and wherein, when the magnetic media moves in a fourth direction opposite the third direction during operation of the tape head, the magnetic media is spaced from the second media facing surface.

The second SGV head assembly is controllable to write data to the magnetic media using the second write transducer of each pair and read verify the data using the second read transducer of each pair when the magnetic media moves in the third direction. The magnetic media wraps around the second internal edge at an angle of about 0.5° to about 1.3°. The first SGV head assembly is controllable to write data to the magnetic media using the first write transducer of each pair and read verify the data using the first read transducer of each pair when the magnetic media moves in the fourth direction. The magnetic media wraps around the second internal edge at an angle of about 0.5° to about 1.3°.

The tape drive further comprises the tape head, and a controller configured to: control the first SGV module head assembly to write data to the magnetic media using the plurality of first write transducers and read verify the data using the plurality of first read transducers, control the second SGV module head assembly to write data to the magnetic media using the plurality of second write transducers and read verify the data using the plurality of second read transducers, and independently move the first and second guides.

While the foregoing is directed to embodiments of the present disclosure, other and further embodiments of the disclosure may be devised without departing from the basic scope thereof, and the scope thereof is determined by the claims that follow.

What is claimed is:

1. A tape head, comprising:
a first same gap verify (SGV) head assembly, comprising:
a first media facing surface having a first internal edge and a first external edge; and
a plurality of first write transducer and first read transducer pairs disposed at the first media facing surface; and
a second SGV head assembly disposed adjacent to the first SGV head assembly, comprising:
a second media facing surface having a second internal edge and a second external edge; and
a plurality of second write transducer and second read transducer pairs disposed at the second media facing surface,
wherein, during operation of the tape head, a magnetic media wraps around either the first internal edge or the second internal edge, and
wherein the first SGV head assembly is controllable to write data to the magnetic media using the first write transducer of each pair and read verify the data using the first read transducer of each pair, and the second SGV head assembly is controllable to write data to the magnetic media using the second write transducer of each pair and read verify the data using the second read transducer of each pair.

2. A tape head, comprising:
a first same gap verify (SGV) head assembly, comprising:
a first media facing surface having a first internal edge and a first external edge; and
a plurality of first write transducer and first read transducer pairs disposed at the first media facing surface; and
a second SGV head assembly disposed adjacent to the first SGV head assembly, comprising:
a second media facing surface having a second internal edge and a second external edge; and
a plurality of second write transducer and second read transducer pairs disposed at the second media facing surface,
wherein, during operation of the tape head, a magnetic media wraps around either the first internal edge or the second internal edge, and wherein the magnetic media wraps around either the first internal edge or the first external edge at an angle of about 0.5° to about 1.3° with respect to the first media facing surface.

3. A tape head, comprising:
a first same gap verify (SGV) head assembly, comprising:
a first media facing surface having a first internal edge and a first external edge; and
a plurality of first write transducer and first read transducer pairs disposed at the first media facing surface; and
a second SGV head assembly disposed adjacent to the first SGV head assembly, comprising:
a second media facing surface having a second internal edge and a second external edge; and a plurality of second write transducer and second read transducer pairs disposed at the second media facing surface, wherein, during operation of the tape head, a magnetic media wraps around either the first internal edge or the second internal edge, wherein when the magnetic media wraps around the first internal edge, the magnetic media is spaced from the second media facing surface, and wherein when the magnetic media wraps around the second internal edge, the magnetic media is spaced from the first media facing surface.

4. The tape head of claim 3, wherein the magnetic media is spaced from either the first media facing surface or the second media facing surface a distance of about 0.2 µm to about 2.0 µm.

5. The tape head of claim 1, wherein the first SGV head assembly and the second SGV head assembly are arranged in a closure-to-closure configuration.

6. A tape head, comprising:
  a first same gap verify (SGV) head assembly, comprising:
    a first media facing surface having a first internal edge and a first external edge; and
    a plurality of first write transducer and first read transducer pairs disposed at the first media facing surface; and
  a second SGV head assembly disposed adjacent to the first SGV head assembly, comprising:
    a second media facing surface having a second internal edge and a second external edge; and
    a plurality of second write transducer and second read transducer pairs disposed at the second media facing surface,
  wherein, during operation of the tape head, a magnetic media wraps around either the first internal edge or the second internal edge, and wherein the first SGV head assembly is spaced from the second SGV head assembly a distance of about 100 µm to about 1500 µm.

7. A tape drive, comprising:
  a tape head comprising:
    a first same gap verify (SGV) head assembly, comprising:
      a first media facing surface having a first internal edge and a first external edge; and
      a plurality of first write transducer and first read transducer pairs disposed at the first media facing surface; and
    a second SGV head assembly disposed adjacent to the first SGV head assembly, comprising:
      a second media facing surface having a second internal edge and a second external edge; and
      a plurality of second write transducer and second read transducer pairs disposed at the second media facing surface, wherein, during operation of the tape head, a magnetic media wraps around either the first internal edge or the second internal edge; and
  a controller configured to:
    control the first SGV module head assembly to write data to the magnetic media using the plurality of first write transducers and read verify the data using the plurality of first read transducers; and
    control the second SGV module head assembly to write data to the magnetic media using the plurality of second write transducers and read verify the data using the plurality of second read transducers.

8. A tape drive, comprising:
  a tape head comprising:
    a first same gap verify (SGV) head assembly, comprising:
      a first closure comprising a first closure edge at a first media facing surface;
      a first substrate disposed adjacent to the first closure, the first substrate comprising a first substrate edge at the first media facing surface; and
      a plurality of first write transducer and first read transducer pairs disposed between the first closure and the first substrate; and
    a second SGV head assembly disposed adjacent to the first SGV head assembly, comprising:
      a second closure comprising a second closure edge at a second media facing surface;
      a second substrate disposed adjacent to the second closure, the second substrate comprising a second substrate edge at the second media facing surface; and
      a plurality of second write transducer and second read transducer pairs disposed between the second closure and the second substrate;
    a first guide disposed proximate to the first SGV head assembly; and
    a second guide disposed proximate to the second SGV head assembly, wherein, during operation of the tape head, a magnetic media contacts either the first media facing surface or the second media facing surface depending upon a direction the magnetic media is moving.

9. The tape drive of claim 8, wherein the first SGV head assembly is controllable to write data to the magnetic media using the first write transducer of each pair and read verify the data using the first read transducer of each pair, and wherein the second SGV head assembly is controllable to write data to the magnetic media using the second write transducer of each pair and read verify the data using the second read transducer of each pair.

10. The tape drive of claim 8, wherein the first and second guides are independently movable in a direction perpendicular to the direction the magnetic media moves.

11. The tape drive of claim 8, wherein the first SGV head assembly and the second SGV head assembly are arranged in a closure-to-closure configuration, wherein the magnetic media wraps around the first closure edge when the tape moves in a first direction, and wherein the magnetic media wraps around the second closure edge when the tape moves in a second direction opposite the first direction.

12. The tape drive of claim 11, wherein when the magnetic media moves in the first direction, the magnetic media contacts the first media facing surface and is spaced from the second media facing surface, and wherein when the magnetic media moves in the second direction, the magnetic media contacts the second media facing surface and is spaced from the first media facing surface.

13. The tape drive of claim 8, wherein the first SGV head assembly and the second SGV head assembly are arranged in a reverse configuration, wherein the magnetic media wraps around the first closure edge when the tape moves in a first direction, and wherein the magnetic media wraps around the second closure edge when the tape moves in a second direction opposite the first direction.

14. The tape drive of claim 13, wherein when the magnetic media moves in the first direction, the magnetic media contacts the first media facing surface and is spaced from the second media facing surface, and wherein when the magnetic media moves in the second direction, the magnetic media contacts the second media facing surface and is spaced from the first media facing surface.

15. The tape drive of claim 13, wherein the first media facing surface is spaced a distance of about 1 mm to about 2 mm from the second media facing surface.

16. The tape drive of claim 8, further comprising:
a controller configured to:
control the first SGV module head assembly to write data to the magnetic media using the plurality of first write transducers and read verify the data using the plurality of first read transducers; and
control the second SGV module head assembly to write data the magnetic media using the plurality of second write transducers and read verify the data using the plurality of second read transducers.

17. A tape drive, comprising:
a tape head comprising:
a first same gap verify (SGV) head assembly, comprising:
a first media facing surface having a first internal edge and a first external edge; and
a plurality of first write transducer and first read transducer pairs disposed at the first media facing surface;
a second SGV head assembly disposed adjacent to the first SGV head assembly, comprising:
a second media facing surface having a second internal edge and a second external edge; and
a plurality of second write transducer and second read transducer pairs disposed at the second media facing surface;
a first guide disposed proximate to the first SGV head assembly, the first guide being movable in a first direction and a second direction opposite the first direction; and
a second guide disposed proximate to the second SGV head assembly, the second guide being movable in the first direction and the second direction,
wherein, when a magnetic media moves in a third direction perpendicular to the first direction during operation of the tape head, the magnetic media is spaced from the first media facing surface, and
wherein, when the magnetic media moves in a fourth direction opposite the third direction during operation of the tape head, the magnetic media is spaced from the second media facing surface.

18. The tape drive of claim 17, wherein the second SGV head assembly is controllable to write data to the magnetic media using the second write transducer of each pair and read verify the data using the second read transducer of each pair when the magnetic media moves in the third direction.

19. The tape drive of claim 18, wherein the magnetic media wraps around the second internal edge at an angle of about 0.5° to about 1.3°.

20. The tape drive of claim 17, wherein the first SGV head assembly is controllable to write data to the magnetic media using the first write transducer of each pair and read verify the data using the first read transducer of each pair when the magnetic media moves in the fourth direction.

21. The tape drive of claim 20, wherein the magnetic media wraps around the second internal edge at an angle of about 0.5° to about 1.3°.

22. The tape drive of claim 17, further comprising:
a controller configured to:
control the first SGV module head assembly to write data to the magnetic media using the plurality of first write transducers and read verify the data using the plurality of first read transducers;
control the second SGV module head assembly to write data the magnetic media using the plurality of second write transducers and read verify the data using the plurality of second read transducers; and
independently move the first and second guides.

* * * * *